(12) United States Patent
Mullen et al.

(10) Patent No.: US 8,931,703 B1
(45) Date of Patent: Jan. 13, 2015

(54) PAYMENT CARDS AND DEVICES FOR DISPLAYING BARCODES

(75) Inventors: Jeffrey D. Mullen, Pittsburgh, PA (US); Philip W. Yen, Cupertino, CA (US); Bruce S. Cloutier, Jeannette, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 12/724,575

(22) Filed: Mar. 16, 2010

Related U.S. Application Data

(60) Provisional application No. 61/160,551, filed on Mar. 16, 2009.

(51) Int. Cl.
*G06K 19/08* (2006.01)

(52) U.S. Cl.
CPC ..................... *G06K 19/083* (2013.01)
USPC .............. 235/487; 235/493; 235/494

(58) Field of Classification Search
USPC ................................. 235/487–495
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,450,491 A * | 9/1995 | McNair ........................ | 713/184 |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Christle I Marshall

(57) ABSTRACT

A payment card is provided with a display. A barcode may be selectively displayed on the display. A display may be an electrochromic display in order to increase the readability of a displayed barcode with respect to computer vision equipment. A barcode may be selected by a user from a set of barcodes. Each barcode in a set of barcodes may correspond to a different loyalty account for a different merchant. Accordingly, a user can carry a single card—but may be able to communicate multiple loyalty account barcodes to computer vision equipment across multiple merchants.

21 Claims, 17 Drawing Sheets

(56) References Cited

U.S. PATENT DOCUMENTS

| | | |
|---|---|---|
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,789,732 A * | 8/1998 | McMahon et al. ............ 235/487 |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,097,108 B2 * | 8/2006 | Zellner et al. ................ 235/492 |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0034717 A1 * | 10/2001 | Whitworth ...................... 705/64 |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0066883 A1 * | 4/2003 | Yu .................................. 235/382 |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0140361 A1 * | 7/2004 | Paul et al. ................. 235/462.45 |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |

(56) References Cited

U.S. PATENT DOCUMENTS

| | | | |
|---|---|---|---|
| 2005/0230473 A1* | 10/2005 | Fajkowski | 235/383 |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0095369 A1* | 5/2006 | Hofi | 705/39 |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0243806 A1* | 11/2006 | Goodman et al. | 235/462.13 |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0114284 A1* | 5/2007 | Brabec et al. | 235/462.01 |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0192249 A1 | 8/2007 | Biffle et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128505 A1* | 6/2008 | Challa et al. | 235/462.13 |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2011/0028184 A1 | 2/2011 | Cooper | |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
English translation of JP 05210770 A.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.

* cited by examiner

700

Http://www.poweredcards.com

Welcome Jeffrey,

Please select a group of barcodes and press "generate code" to transfer barcodes to your card and associated the barcodes to your account.

☒ Walmart  ☐ Giant Eagle   [Gen Light Code] 726
☒ CVS      ☐ Target        [Gen Sound Code] 727
☐ Best Buy ☐ Blockbuster   [Gen Manual Code] 728

To add a barcode, simply type in the UPC below

[_____] 724

[ADD UPC] 725

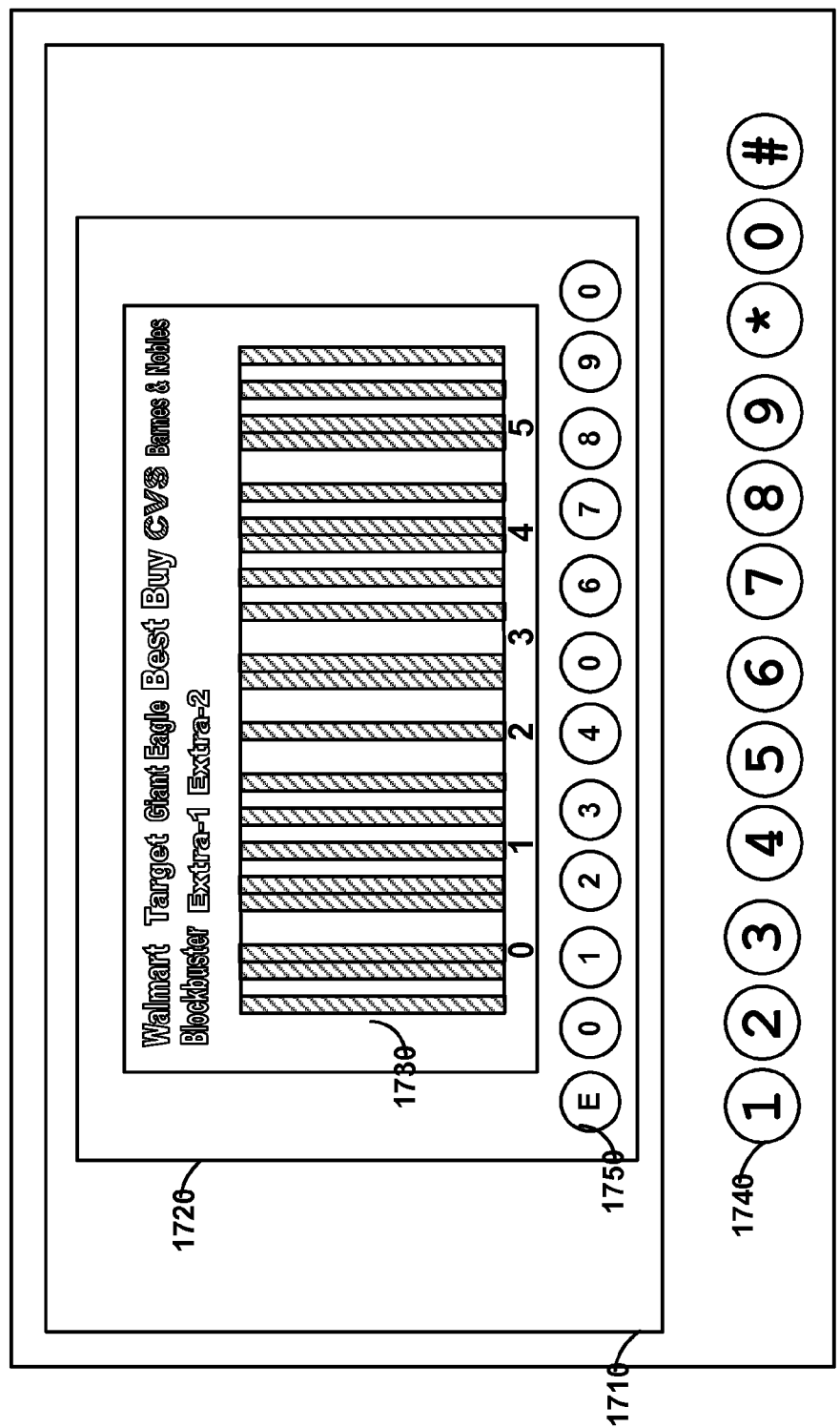

PAYMENT CARDS AND DEVICES FOR DISPLAYING BARCODES

CROSS-REFERENCE TO RELATED APPLICATIONS

This application claims the benefit of Provisional Patent Application No. 61/160,551, filed on Mar. 16, 2009, which is hereby incorporated by reference herein in its entirety.

BACKGROUND OF THE INVENTION

This invention relates to magnetic cards and devices and associated payment systems.

Barcodes are traditionally printed on product labels. Barcodes are permanently configured (i.e., printed) to represent specific information. Computer vision equipment at the point of purchase can determine such specific information from a barcode.

SUMMARY OF THE INVENTION

A card is provided that may include a display. One or more barcodes may be provided on the display. Accordingly, computer vision equipment at a point of purchase may be able to extract information from such displayed barcodes. In changing the configuration of a barcode to display different data at different times, numerous advantageous features may be realized.

A card displaying a barcode may take many forms. For example, a payment card may display barcodes. Such a payment card may be, for example, a credit card, debit card, or a pre-paid value card. Other types of cards may also display barcodes. Such other cards may include medical cards, security access cards, identification cards, gaming cards, gambling cards, loyalty cards, or any other type of card. Such other cards may be battery-powered.

A dynamic loyalty card may be provided, in which multiple loyalty accounts are stored in on-card memory and displayed via an on-card display to a user. User interfaces (e.g., buttons) may be utilized to receive manual input from a user such that the user may select a particular loyalty account for display as a barcode. A user may also utilize such user interfaces in order to program a new loyalty account into the on-board memory. Alternatively, information may be programmed autonomously into a card. For example, a light sensor may be provided on a card that is able to receive light pulses representative of loyalty account information.

A card may include a bi-stable display to display a barcode. Such a bi-stable display may not utilize power to maintain the display of a barcode, but may utilize power to change the indicia that is displayed. The bi-stable nature of a bi-stable display may, for example, not reflect light in the same manner as a non bi-stable display (e.g., an LCD). Accordingly, for example, computer vision equipment may be able to read information more easily from a barcode on a bi-stable display than a non bi-stable display.

A card may include a non bi-stable display to display a barcode. A non bi-stable display may, for example, be able to change displayed indicia (e.g., barcodes) more quickly than, for example, a bi-stable display.

An electrochromic display may be utilized to display barcodes. Such an electrochromic display may increase, for example, the readability of a displayed barcode to computer vision equipment.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader. A card equipped with a display and a dynamic magnetic communications device may communicate any type of information to points of purchase that have either computer vision equipment or magnetic stripe readers.

Barcodes that are displayed on cards may take a variety of forms. For example, a barcode may take the form of a Universal Product Code (UPC). Such a UPC may represent, for example, twelve digits of information where the twelfth digit is a check-sum digit. Such a check-sum digit may be a number generated from an algorithm that utilizes the first eleven digits as input. Accordingly, such a check-sum digit may be utilized to determine whether information included in a UPC was correctly deciphered. A card may display multiple different types of barcodes that represent different types as well as lengths of information. Barcodes may represent, for example, numerical or alphanumerical data. Barcodes may include lines that have varying spaces as well as widths that are utilized to represent information.

Barcodes displayed on cards, such as payment or loyalty cards, may take many forms. Barcodes may represent payment account numbers (e.g., credit card, debit card, or pre-paid value numbers). Barcodes may represent loyalty account numbers such as, for example, loyalty account numbers for retail stores, gas stores, food stores, or conglomerate of stores (e.g., mall loyalty cards). Barcodes may also be utilized to represent, for example, products that a user desires to purchase, a group of products that a user desires to purchase, identification information, business card information, coupon codes, lottery ticket information, boarding pass information, event ticket information, or any other type of information.

One or more barcodes may be permanently printed onto a card. Such barcodes may represent an account number such as a payment account number. An account number may be a master number. A user may associate multiple loyalty cards to the master number. Alternatively, for example, a merchant (e.g., a grocery store chain) may utilize compute vision equipment to capture a user's master number and may associate this master number to a merchant loyalty number assigned to the user by the merchant. In doing so, for example, multiple merchants may associate multiple loyalty numbers to a master number. A card may be fabricated utilizing a printed circuit board process (e.g., an FR4 process). A barcode may be permanently printed onto a card utilizing a printing step of such a printed circuit board process. Accordingly, for example, a barcode may be printed in a conductive material such as copper or printed in a colored silkscreen (e.g., black, white, or black and white).

One or more barcodes may be permanently provided on a card, but as permanent electrodes to a display (e.g., electrochromic) display. Accordingly, for example, a barcode may be printed in conductive material on a layer of material (e.g., FR4 material). S substance that reacts to such an electrode to display a color may be provided over these conductive materials. A sealing layer may be provided to seal the substance against the layer of material. In doing so, for example, a barcode may be permanently printed on a card, but may only be visible when voltages are provided to the permanent electrodes. In doing so, multiple permanent barcodes may be printed on a card, but such permanent barcodes may be selectively displayed. Furthermore, such a permanent barcode that requires display may be more secure than a barcode permanently printed on, and always visible from, a card.

Electrodes may take the form of lines. Such lines may have a width that corresponds to the smallest resolution (in terms of line width) to display information under a particular barcode format. The lines may be placed adjacent to one another. The number of lines may correspond to the number of lines utilized to display information under a particular barcode format. A display may be able to display multiple barcodes having different line resolution requirements provided, for example, the barcode can display the highest resolution barcode of the different line resolution requirements for those multiple barcodes. A display may be able to display pixels such that, for example, multiple pixels may be utilized to display a line of a barcode.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 7 is an illustration of a website constructed in accordance with the principles of the present invention;

FIG. 17 is an illustration of a personal electronic device constructed in accordance with the principles of the present invention.

DETAILED DESCRIPTION OF THE INVENTION

Figure 1:
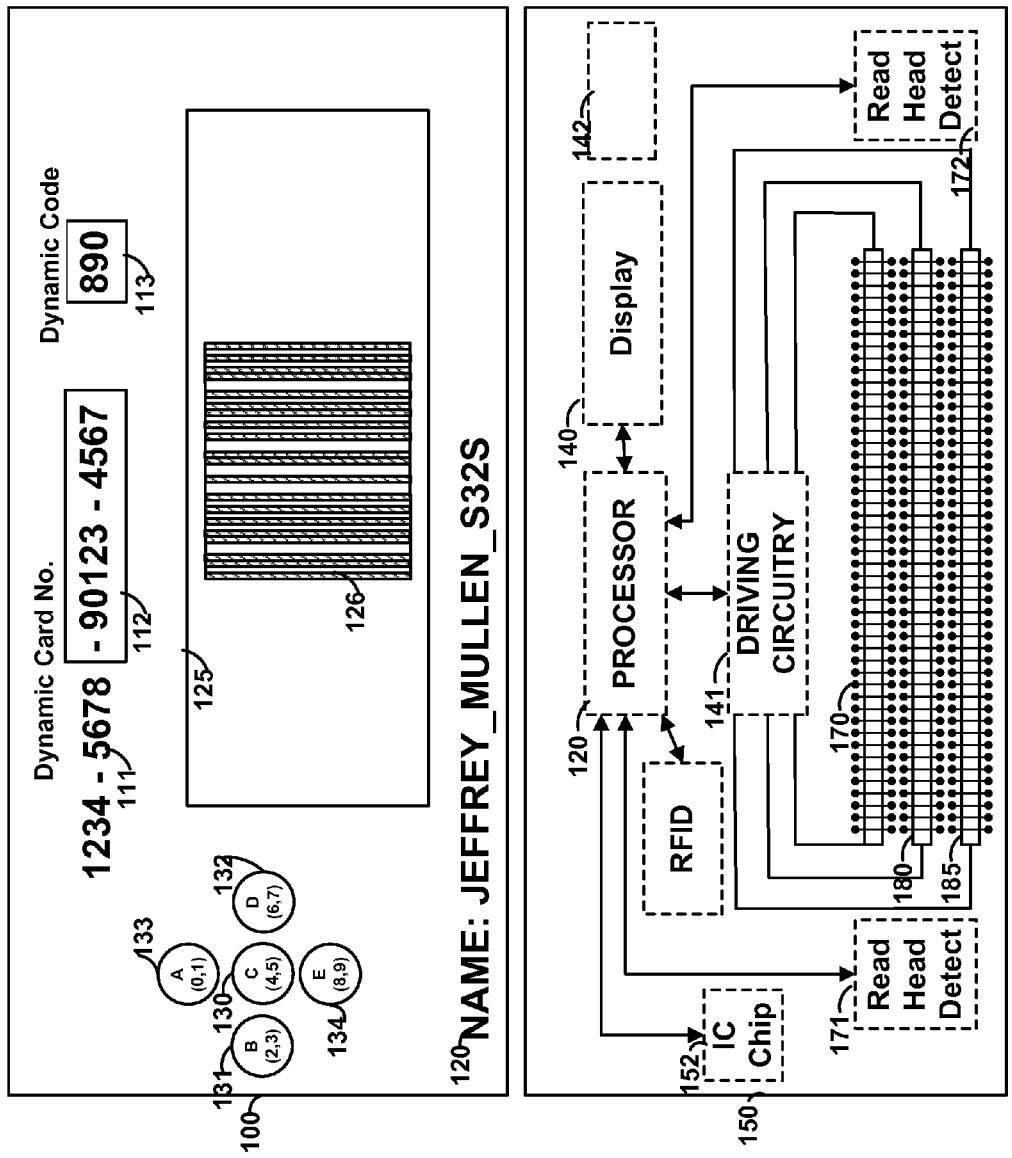
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed on card 100. Multiple displays may be provided on a card. For example, display 113 may be utilized to display a dynamic code such as a dynamic security code. Display 125 may also be provided to display dynamic barcode 126.

Dynamic barcode 126 may be configured to display all states of information in a particular barcode scheme. For example, a twelve digit barcode scheme may be utilized. Accordingly, for example, dynamic barcode 126 may be configured to display any specific twelve digit number of such a twelve digit barcode scheme. Display 125 may display additional information. For example, display 125 may display a dynamic number such as a dynamic payment account number. Persons skilled in the art will appreciate that a dynamic payment account number may be utilized to authorize a payment transaction. A dynamic security code may be utilized, for example, to validate a dynamic number for a Card Not Present (CNP) transaction such as an online transaction. A dynamic number may, for example, be changed based on time (e.g., changed periodically) or based on use (e.g., based on manual input from one or more buttons).

Display 125 may more generally display a barcode. A barcode may be generated from information stored in a memory of card 100. For example, a particular barcode may be associated with a particular number. This particular number may be stored. A processor on card 100 may retrieve a number from memory and apply an algorithm to the number to determine how to generate an associated barcode for display. Similarly, a processor may execute a checksum algorithm to determine a checksum digit for the barcode. Barcode information may be stored, however, with any check-sum digits already calculated. Persons skilled in the art will appreciate that barcodes and check-sums may more generally be characters. Particular barcode schemes may utilize alphanumeric characters. Other particular barcode schemes may utilize numerical characters.

A barcode may be associated with a loyalty account for a merchant. For example, card 100 may include a memory capable of storing 10 or more barcodes (e.g., 100 or more barcodes). As barcodes may be stored as the character information the barcodes represent instead of image data, the barcode data may not utilize a lot of memory when stored. A display, such as an electrochromic display, may be provided with electrodes that are in the shape of individual barcode lines. A mapping algorithm may map which one(s) of these lines should be displayed for any particular character or sets of characters. Accordingly, a processor may map stored characters to particular electrodes. Accordingly, the processor may provide a drive voltage to drive the electrode such that an associated line is perceived by a user on a display.

In storing multiple barcodes, a user may store multiple loyalty account barcodes on a single card. Card 100 may be the size of, for example, a credit card or debit card (e.g., approximately 85 mm×approximately 54 mm). Card 100 may include an aperture and may be small enough to place around a keychain (e.g., less than 1.5 inches by less than 1 inch). Accordingly, a user may approach a point of purchase at a merchant and may utilize card 100 to display a barcode associated with that user's loyalty account for that merchant.

Buttons may be provided on a card. For example, buttons 130-134 may be provided. Buttons 130-134 may be utilized by a user to select one of numerous barcodes to display. Indicia may be displayed on a display to help a user select the appropriate barcode. For example, a list of names may be displayed. A user may utilize buttons to scroll up and down the list (e.g., button 133 and 134). A user may utilize a button to select a barcode for display (e.g., button 130). A display may acknowledge a selection by highlighting the name of the selection or by providing additional indicia representative of a selection. A user may utilize a button (e.g., button 130) to confirm a selection. A barcode may be displayed for a period of time. A light sensor may be provided on a card and may look for a signal received from computer vision equipment. For example, a light sensor may be utilized to detect the presence of light from a laser eye. Once a laser eye is detected, a card may start a timer to turn a display OFF to conserve the consumption of electrical energy. For example, a card may reset and count down a timer from approximately 30 seconds every time that a light from a laser eye is detected. In doing so, a barcode may be displayed as long as the card believes a laser eye is trying to discern information. If a laser eye tries to read the card five times, then the clock may reset to 30 seconds and begin the countdown again every time the laser eye is detected.

Buttons may include printed indicia in the form of numerical characters, alphanumerical characters, or icons (e.g., logos such as store logos). A display may be placed next to each button such that the information associated with each button may be changed.

Buttons may be utilized to enter new barcode data into a card. For example, a user may receive a loyalty account number at a merchant and may simply type that account number into a card. One or more characters of an account number may be utilized to identify the merchant. For example, one merchant may begin with the number "101" while another may begin with the number "102." Accordingly, card 100 may be able to store the names of 1,000 merchants (merchants "000"-"999"). Thus, a user may type in a number into card 100, card 100 may recognize the merchant identifying digits, and card 100 may retrieve the name of the merchant and display the name next a particular button. A processor may display the manually input barcode whenever the user, for example, presses the button that the processor associated to the manually input barcode.

Buttons 130-134 may be utilized, for example, to accept manual input indicative of an unlocking code. Such an unlocking code may be, for example, 4, 5, or 6 characters in length. Buttons 130-134 may include both numerical and alphabetical characters such that unlocking codes may be assigned in multiple character sets. A card may be issued with a default unlocking code that a user can change at first use as well as any time. A card may not perform any user-initiated tasks, for example, until a valid unlocking code has been entered. A master unlocking code may be provided on a card such that a user may call a toll free number if the user forgets his unlocking code. Such a master unlocking code may reset a card such that a user may be directed to enter an unlocking code for a card. A card may lock for a period of time (e.g., an hour) after a pre-determined number of consecutive incorrect locking codes are entered (e.g., 10 consecutive incorrect unlocking codes).

Identification information 120 may be, for example, printed as well as embossed on a surface of card 100. Identification information 120 may take the form of a name of a cardholder. Expiration data may be printed, as well as embossed, on a card.

Identification information and expiration data may be displayed on a display. Additionally, for example, such information may be included in a barcode.

A unique serial number may be printed on a printed circuit board layer while that printed circuit board layer is being fabricated. Such a unique serial number may serve, for example, as a master barcode. Merchants may record this master barcode data and associate this master barcode data to a loyalty account on remote servers of the merchant such that a merchant can accept either the master barcode or a barcode associated with a loyalty account.

Persons skilled in the art will appreciate that loyalty accounts may be utilized to obtain discounts on items. For example, a grocery store loyalty account may automatically provide discounts on particular items at the point of purchase. Similarly, a loyalty account may be utilized to obtain reward points associated with the purchase price of selected items. For example, an electronics store may provide a loyalty program where a number of reward points are earned for every dollar spent and associated with a loyalty account.

Barcodes can be utilized to perform particular functions. For example, a user may be provided with a button indicative of spending points of a particular loyalty program. In such an instance, a different barcode may be provided. For example, a twelve digit number may be displayed as a barcode, but one of the digits of this number may be indicative of additional functionality. For example, a particular digit may be represented as a "1" if the user desires to earn points and a "2" if the user desires to spend points. Accordingly, information may be embedded into a barcode, at the direction of a user, in order to communicate additional information at the point of purchase.

A user may be provided with a printed receipt that includes a barcode. Such a barcode may be indicative of, for example, a coupon for a future purchase. A barcode may include a set of characters (e.g., a set of numbers) beneath the barcode that is representative of the information stored in the barcode. Accordingly, for example, a user can determine barcode information without the assistance of computer vision equipment. A user may, for example, utilize buttons to input the characters for any barcode (e.g., the characters underneath a barcode on a receipt) such that the user can display that barcode on his/her card. In doing so, for example, a user can throw away a receipt having a barcode after the barcode is entered into the card.

Card 150 may be provided that includes, for example, processor 120 driving magnetic emulators 170, 180, and 185 through driving circuitry 141. Persons skilled in the art will appreciate that emulators 170 may generate electromagnetic fields that may communicate data to read heads of a magnetic stripe reader. Particularly, for example, a magnetic stripe reader may include a read-head housing having three read-heads. Magnetic emulator 170 may communicate data to one of those read heads. Magnetic emulator 180 may communicate data to a different one of those read heads. Magnetic emulator 185 may communicate data to yet another different one of those read heads. Each of magnetic emulators 170, 180, and 185 may, for example, communicate data serially. The magnetic emulators may communicate different blocks of data of varying lengths (or the same length) and at different speeds (or the same speed). For example, card 150 may include two magnetic emulators and one emulator (e.g., emulator 185) may communicate at least 400 bits of data to a read-head and another emulator (e.g., emulator 180) may communicate at least 200 bits of data to a different read-head. This data may be, for example, communicated serially and both emulators may transmit data to different read-heads at the same time. Accordingly, for example, a card may change the information that is transmitted to a magnetic stripe reader every time the card is swiped through that magnetic stripe reader. Read-head detectors 171 and 172 may be utilized to sense the presence of, for example, a read-head housing such that processor 120 may begin transmission of data when the read-head housing is located over magnetic emulators 170, 180, and 185. Each magnetic emulator may be, for example, a single coil. The direction of current may be changed through each emulator at particular times such that data may be communicated under an F2F encoding scheme. Similarly, current may be supplied through a coil, and removed from a coil, at particular times such that data may be communicated under an F2F encoding scheme. Driving circuitry 141 may be utilized, for example, to change the direction of, or control the supply of, a current to one or more magnetic emulators. A coil of a magnetic emulator may include one or more materials in its core. For example, a coil may include a soft-magnetic material as well as a permanent magnet. Such materials may also be located outside of a coil, but within the proximity of the coil such that the materials affect any electromagnetic field generated by a particular coil. A dynamic magnetic stripe communications device may be provided on a card. Such a dynamic magnetic stripe communications device may take many forms. For example, a dynamic magnetic stripe communications device may take the form of one or more magnetic emulators and/or magnetic encoders. A magnetic encoder may write data onto a physical magnetic stripe located on a card. A dynamic magnetic stripe communications device may communicate one or more tracks of magnetic stripe data and/or barcode data to a magnetic stripe reader. Barcode data may be provided, for example, in discretionary data fields located in a magnetic stripe track such that one or more barcodes may be communicated magnetically to a magnetic stripe reader. Similarly, barcode information may be communicated via an IC chip (e.g., an EMV chip) and/or wirelessly (e.g., via an RFID antenna). Accordingly, a barcode may be selected by a user and communicated visually via a display as well as magnetically via magnetic stripe data communicated via a dynamic magnetic stripe communications device.

Processor 120 may include on-board memory. Such memory may include barcode information as well as application code. Card 150 may be provided with default application code as well as default barcode data that may be changed by, for example, a user. Display 140 may be provided such that data may be displayed. Information represented as a barcode may be communicated via one or more magnetic emulators while the barcode is displayed via display 140. Any number of communication devices may be included on card 150. For example, RFID 151 may be included as well as IC chip 152 (e.g., an EMV chip). Any number of additional components 142 may be included. Additional components may include, for example, microphones, speakers, light sensors, batteries, sources of light, energy harvesters, transmitters, receivers, memory, or any other component.

Figure 2:
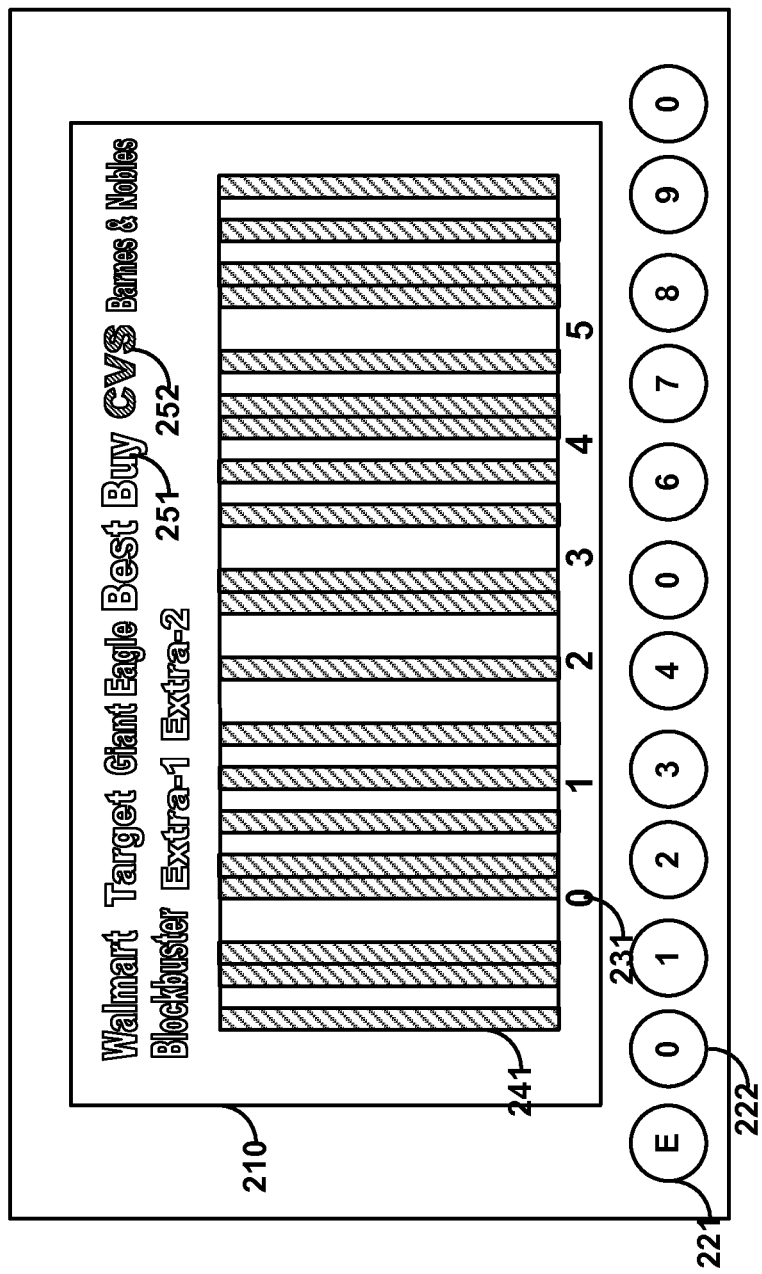
FIG. 2 is an illustration of a card constructed in accordance with the principles of the present invention.

FIG. 2 shows card 200 that may include permanent electrodes 251 and 252. Card 200 may be fabricated, for example, with a number of barcodes for a number of pre-determined merchants (e.g., for loyalty accounts). A user pressing an appropriate button 221 or 222 may cause a particular permanent electrode to display (e.g., indicia 252) as well as corresponding barcode 241 on display 210. Characters 231 may also be displayed and may correspond to the information included in a displayed barcode (e.g., barcode 241). New loyalty account numbers can be entered, for example, into buttons on card 200 and associated to other permanent electrodes (e.g., "Extra-1" and "Extra-2" electrodes). Persons skilled in the art will appreciate that a display may include separately controlled segments and pixels that may be utilized to display various characters, barcodes, and other indicia (e.g., logos).

Figure 3:
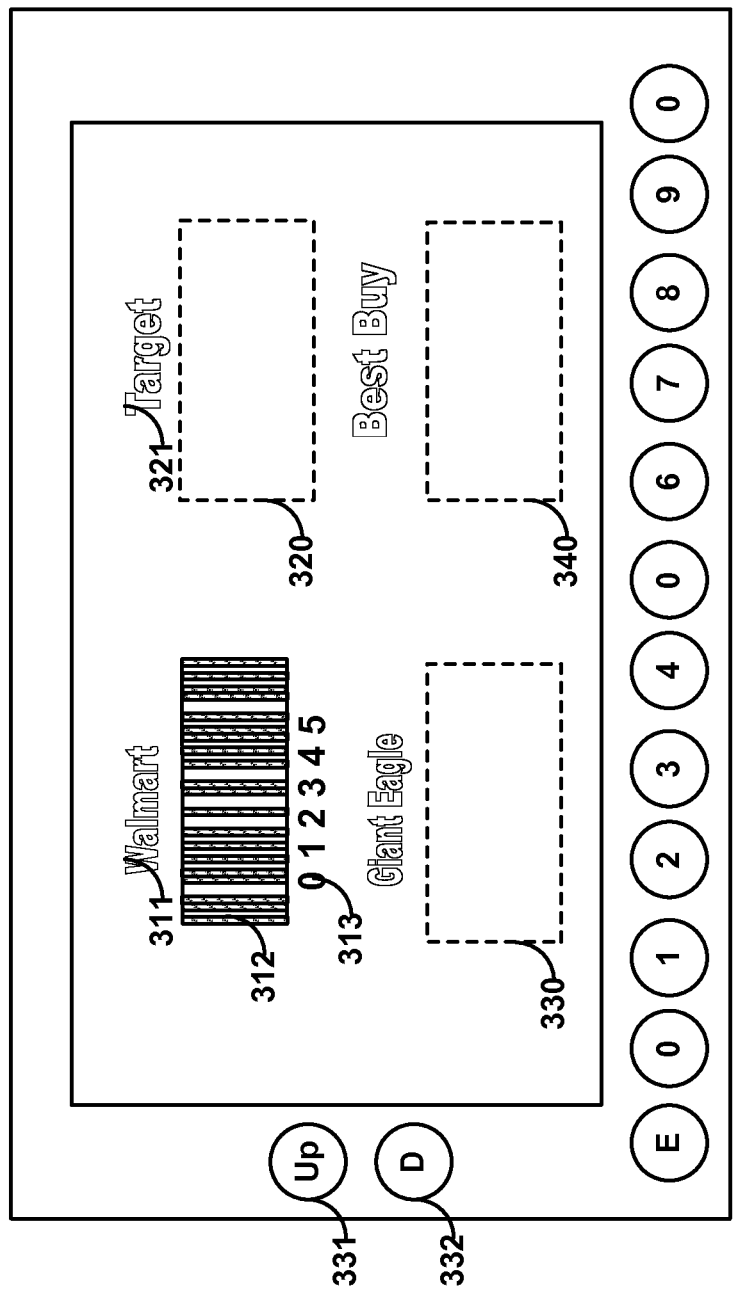
FIG. 3 is an illustration of a card displaying multiple barcodes constructed in accordance with the principles of the present invention.

FIG. 3 shows card 300 that may include barcodes 312, 320, 330, and 340. The information described by barcodes may also be included (e.g., indicia 313). Similarly, additional descriptive information may be included (e.g., indicia 311 and 321). Button 331 may be utilized, for example, to scroll up a table of barcodes while button 332 may be utilized to scroll down the table of barcodes.

Figure 4:
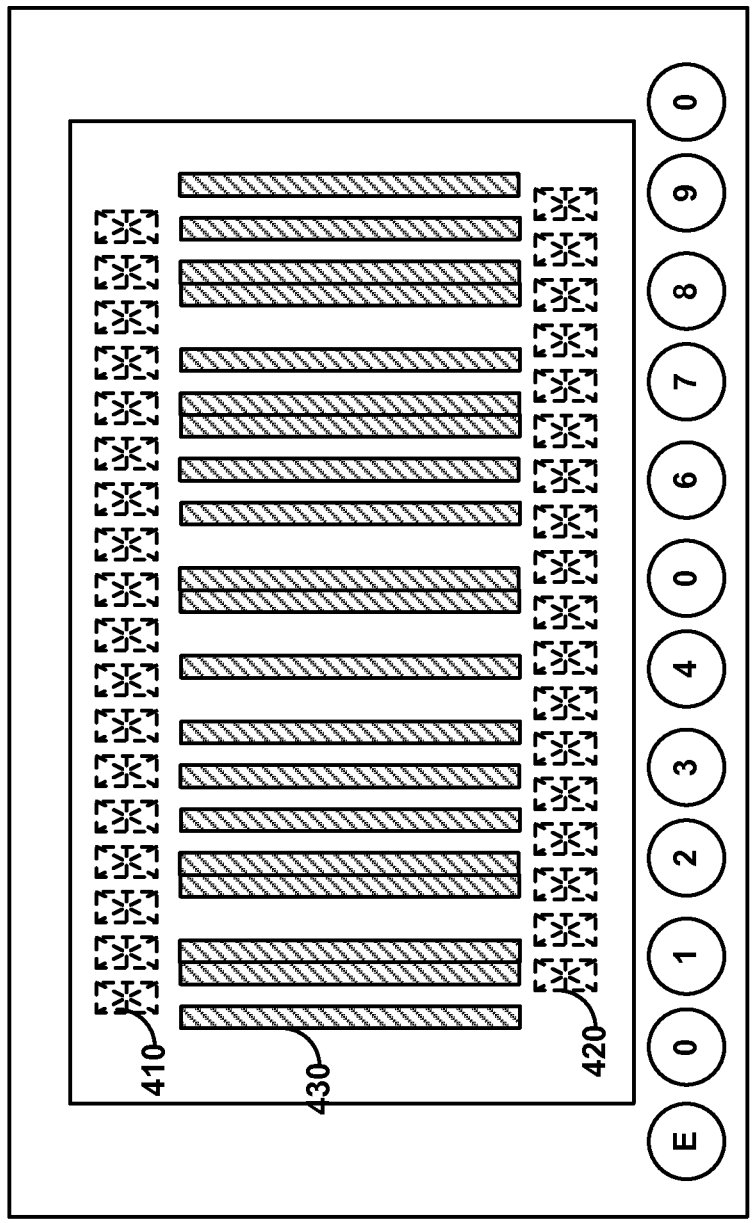
FIG. 4 is an illustration of a card displaying barcode and alphanumeric characters constructed in accordance with the principles of the present invention.

FIG. 4 shows card 400 that may include the ability to display dynamic barcodes (e.g., barcode 430). Multi-segment characters may be displayed via multi-segment character display areas 410 and 420. Such character displays may be, for example, 7-segment, 11-segment, 12-segment, 14-segment, or any number of segment-based character displays. As shown, display area 410 is located above barcode 430 and display area 420 is located below barcode 430.

Figure 5:
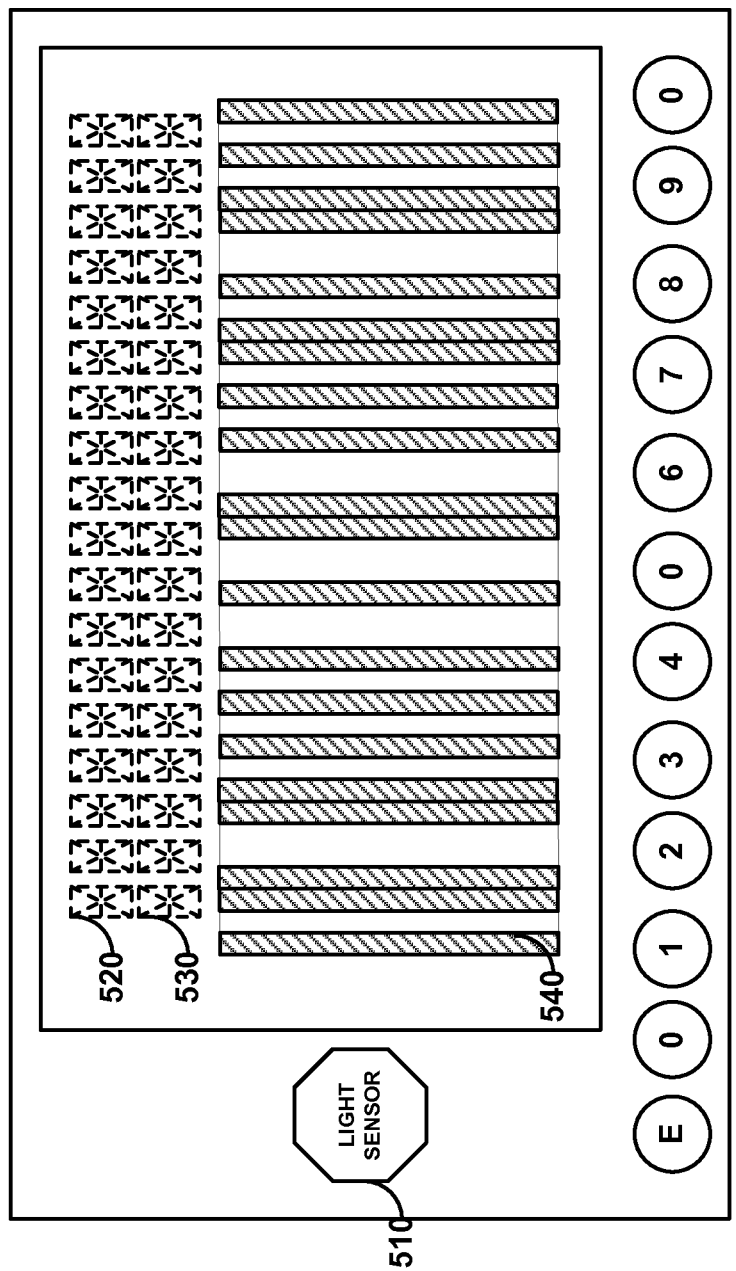
FIG. 5 is an illustration of a card displaying a barcode and multiple adjacent lines of alphanumeric characters constructed in accordance with the principles of the present invention.

FIG. 5 shows barcode 540 with character display areas 520 and 530 located above barcode 540. Accordingly, multiple lines of information (e.g., numbers or alphanumerics) can be displayed. In deploying multiple lines of information, for example, information may be more easily scrolled (e.g., up and down) by a user. Card 500 may include light sensor 510. Light sensor 510 may receive light pulses representative of information and may decode such light pulses to extract such information. Card 500 may then, for example, act on received information. A barcode may, for example, be added to a card via light sensor 510 such that a barcode can be programmed into a card without the need for the data to be entered manually.

Figure 6:
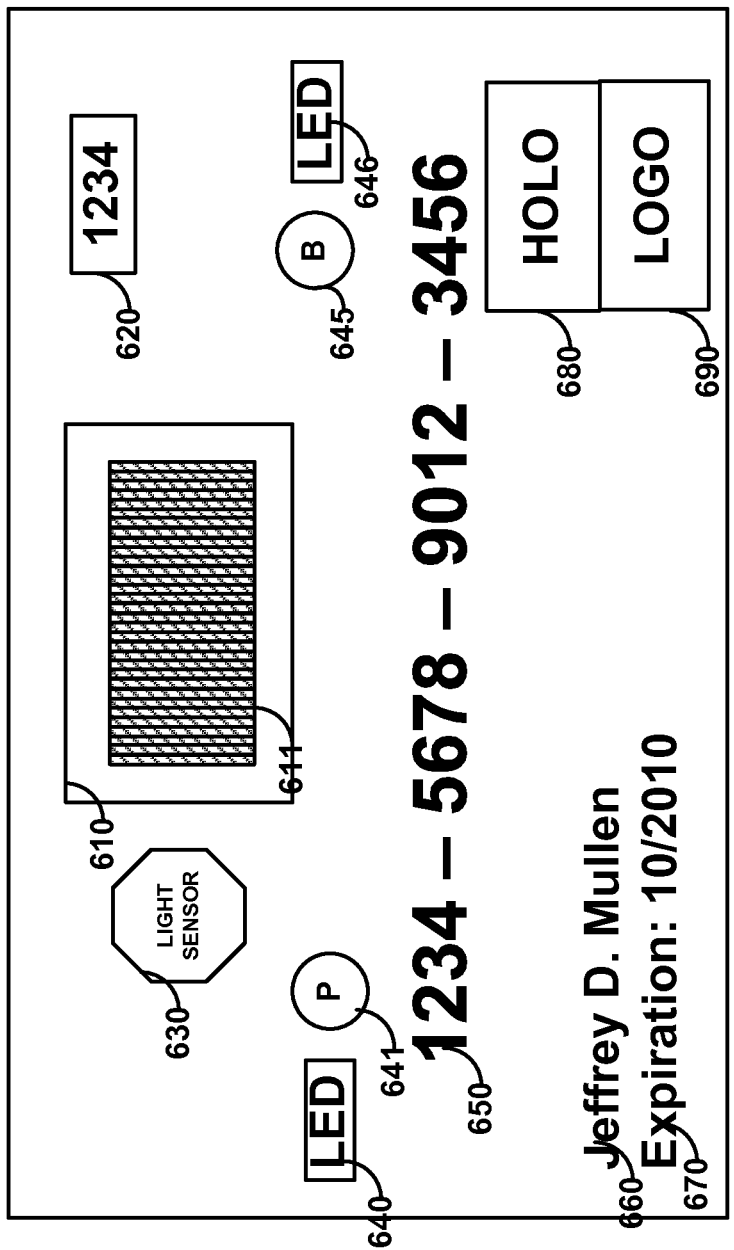
FIG. 6 is an illustration of a card displaying a barcode and a light sensor constructed in accordance with the principles of the present invention.

FIG. 6 shows card 600 that may include, for example display 610 for displaying various barcodes. Display 610 may include a barcode display area 611 that includes a number of display segments in the form of thin lines. Light sensor 630 may be included on card 600 for receiving information via light. One or more buttons 641 and 645 may be included. A number (e.g., a payment card number) may be included as information 650. One or more sources of light 640 or 646 may be included. A light source may emit light upon, for example, the use of a particular button. For example, light source 640 may emit light when button 641 is pressed. In doing so, for example, card 600 may indicate to the user when the card believes a button was pressed. Card 600 may include identification information 660 as well as expiration information 670. Hologram 680 and logo 690 may also be included on card 600. Any number of additional displays may be included on card 600 (e.g., display 620).

FIG. 7 shows browser 700 that includes address bar 710 that retrieves a website from the address in address bar 710 and displays the website on graphical user interface 720. Instructions 721 may be provided on a website. Such instructions may tell a user that the user can select a variety of loyalty cards via selection boxes (e.g., selection boxes 722 to 723). A user can add a loyalty account number in box 721 and upload that loyalty account number using interface 725. Persons skilled in the art will appreciate that each account that is uploaded may be loaded into a card in a variety of ways. For example, button 726 may initiate graphical user interface 720 to emit light pulses representative of the account. Similarly, button 727 may be utilized to generate sound-based information that may be communicated to a microphone of a card. Similarly, button 728 may be utilized to generate a manual code that may, for example, be manually entered into a card to transfer data. Groups of accounts (e.g., barcodes) may be lumped together into a single master code and communicated either autonomously or manually.

Persons skilled in the art will appreciate that barcodes may be utilized in a variety of ways. For example, barcodes may be associated with pre-paid gift cards. Accordingly, for example, a user may be given a large number of gift cards (e.g., during Christmas) and these gift cards may be loaded into a card having the capability to display barcodes. Accordingly, a user may select an appropriate gift card for use when the user is in a particular store. The gift card may be visually displayed as a barcode so that computer vision equipment at the point of purchase can discern gift card data from the barcode. Similarly, the gift card data may be communicated via a magnetic emulator.

Figure 8:
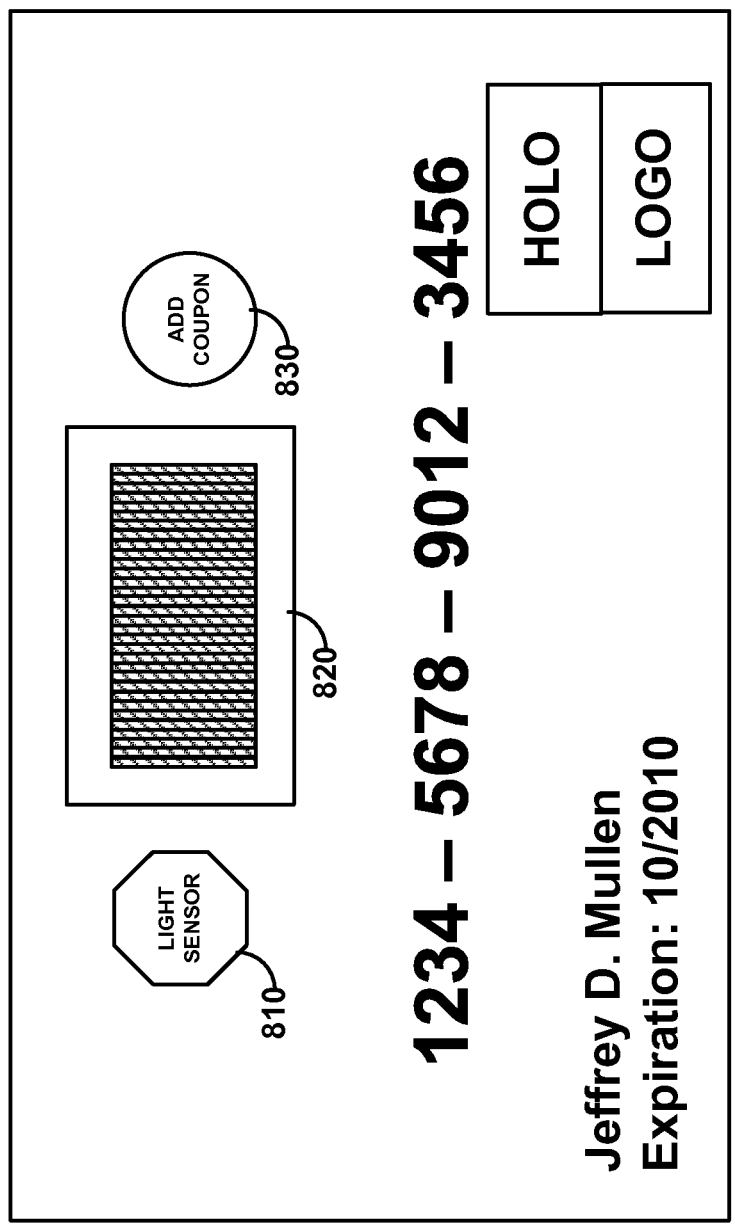
FIG. 8 is an illustration of a card constructed in accordance with the principles of the present invention.

FIG. 8 shows card 800 that may include, for example, light sensor 810, button 830, and display 820 for displaying barcodes. Button 830 may be utilized, for example, to instruct the card that a light-based coupon is desired to be loaded into a card. Store shelves may include light emitters such that coupons may be transferred to a card. At checkout, a user can scroll through all acquired coupons and have all the coupons scanned so the appropriate discounts may be applied. A coupon may be time sensitive and may include expiration information. A card may delete information after such information expires.

Figure 9:
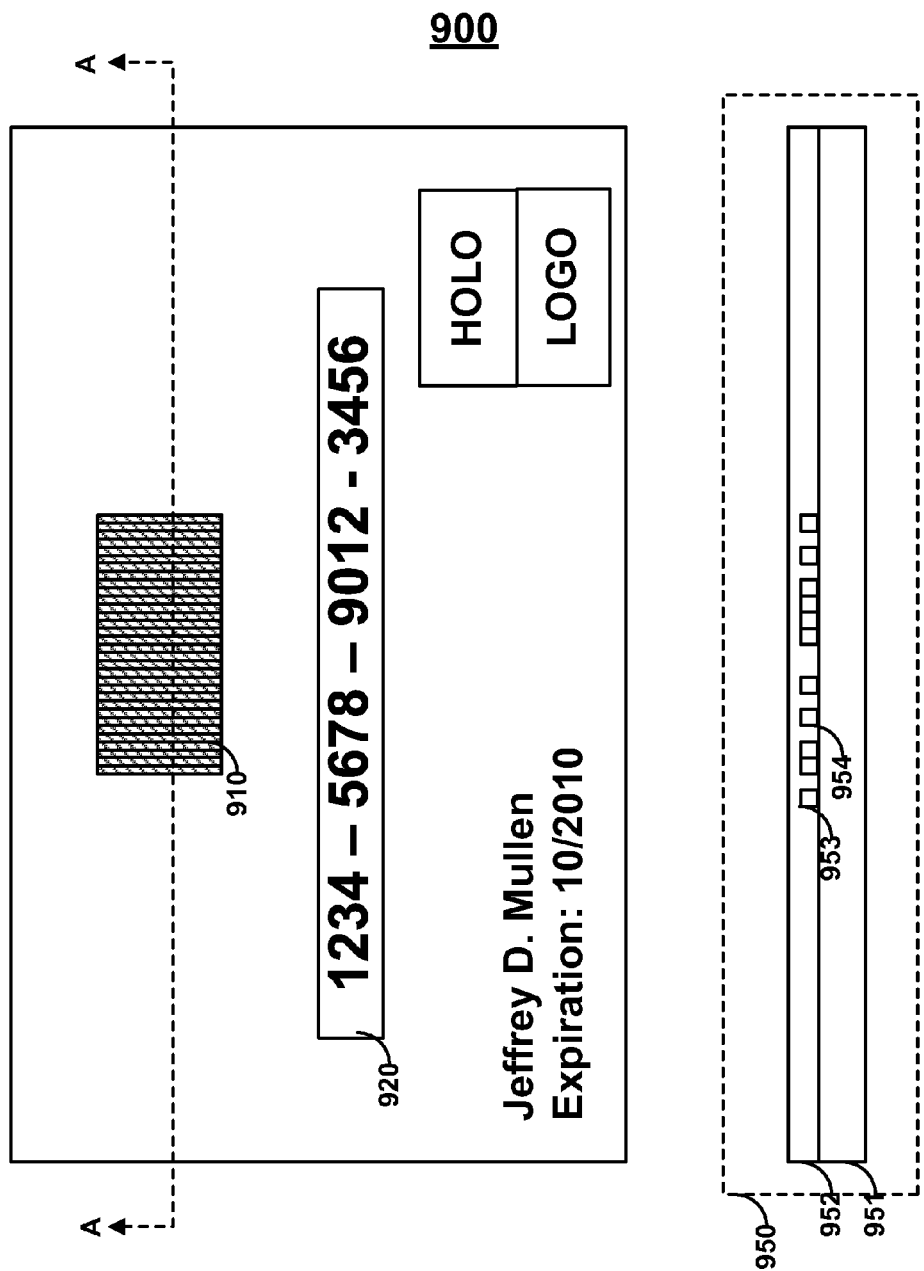
FIG. 9 is an illustration of a card having a permanent barcode constructed in accordance with the principles of the present invention.

FIG. 9 shows card 900 that may have display 920. Display 920 may display, for example, a number such as a payment number that changes based on time or use. Permanent barcode 910 may be provided. Permanent barcode 910 may be printed on a portion of card 900. For example, permanent barcode 910 may be printed in a conductive or silkscreen material as part of a printing step in a single or multiple layer printed circuit board manufacturing process. Permanent barcode 910 may be printed in line segments. Each line segment may be printed in a conductive material and may be provided electrical energy such that the line segments may be used as display segments in a display. A microprocessor may be coupled directly to each line segment or, for example, a microprocessor may be coupled to a multiplexer which, in turn, may be directly coupled to the line segments of a barcode.

Persons skilled in the art will appreciate that a permanent barcode does not have to be displayed for the permanent barcode to be visible by computer vision equipment. Cross section "A" may be portion 950. A barcode may be permanently provided via conductive line segments (e.g., segments 953 and 954) printed on printed circuit board layer 951 (e.g., which may be a layer of FR4). One or both sides of a single or multiple layer printed circuit board may be, for example, laminated (e.g., via laminate 952). Such a lamination process may include, for example, an injection molding process (e.g., a reaction injection molding process) or a HOT lamination process. Line segments (e.g., segments 953 and 954) may be provided in a substance that displays indicia about a line segment when that line segment receives electrical charge.

Figure 10:
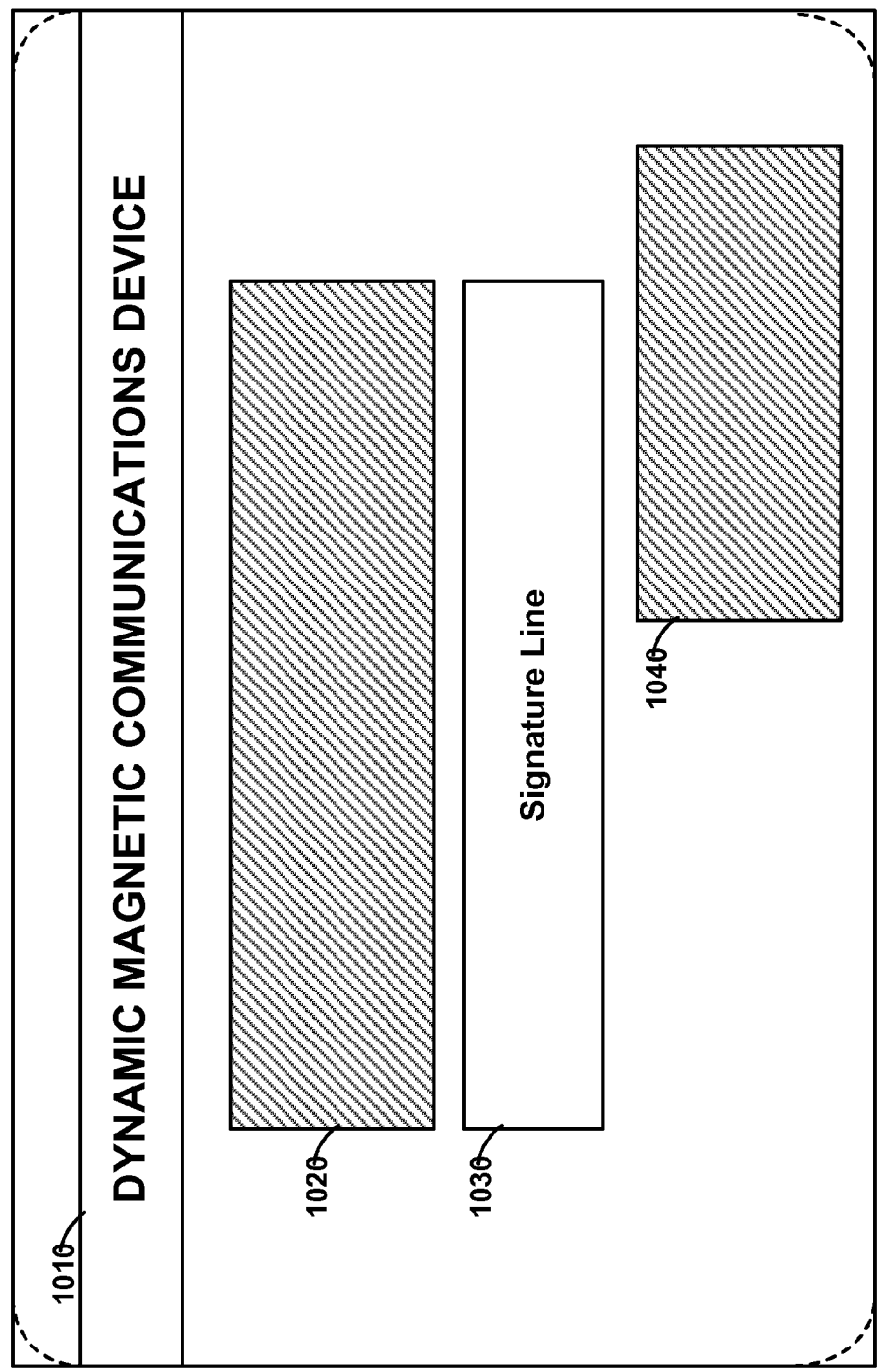
FIG. 10 is an illustration of a card constructed in accordance with the principles of the present invention.

FIG. 10 shows card 1000 that may include dynamic magnetic communications device 1010 (e.g., a magnetic encoder or a magnetic emulator). Card 1000 may also include display 1020, display 1040, and an area for receiving marks from an ink-based instrument (e.g., a pen). Persons skilled in the art will appreciate that displays 1020 and 1040 as well as signature area 1030 may be located on any surface of card 1000 (e.g., the reverse or obverse side). Similarly, dynamic magnetic communications device 1010 may be located on either the reverse or obverse side of a card. Dynamic magnetic communications device 1010 may be included in the center of a card with laminate on each side of device 1010. Device 1010 may be offset towards either surface of a card from the center. For example, device 1010 may be offset approximately 1-50% towards a surface of a card from the center of a card.

Figure 11:
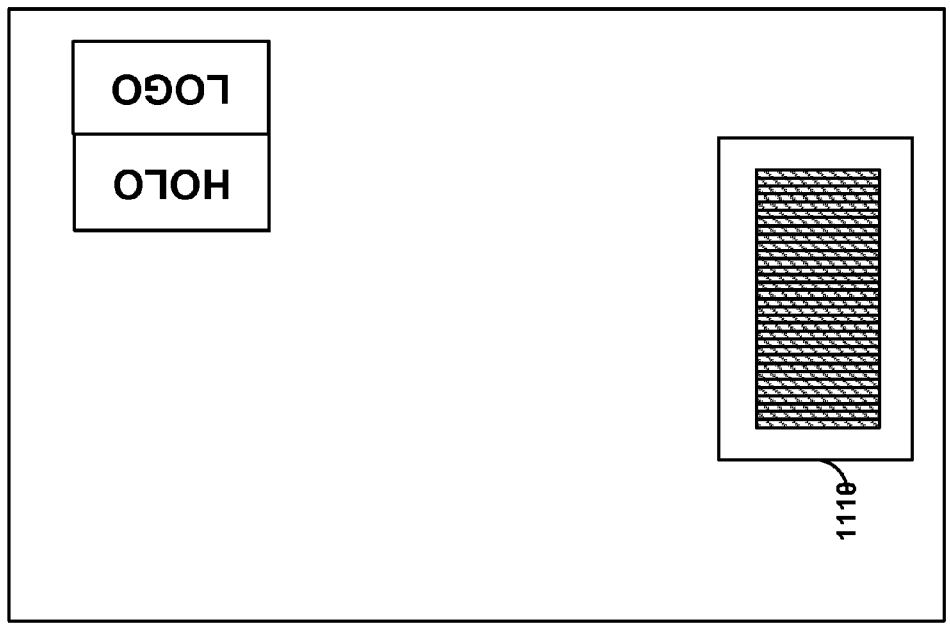
FIG. 11 is an illustration of a card displaying a barcode constructed in accordance with the principles of the present invention.

FIG. 11 shows card 1100 that may include one side that is longer than the other side. Display 1110 may be included on card 1100 and may be located toward the short side of card 1100. Display 1110 may be able to display barcodes. Display 1110 may be configured to display a permanent barcode.

Persons skilled in the art will appreciate that barcodes may take many forms. For example, a barcode may be a one-dimensional barcode based on line-segments or a two-dimensional barcode based on shapes (e.g., rectangles or triangles). Barcodes may also contain information in the color of particular line segments or shapes. Display 1110 may be operable to display multiple colors. Display 1110 may be operable to display substantially two colors (e.g., black and white) and may include a different background color (e.g., blue, green, yellow, or red).

Figure 12:
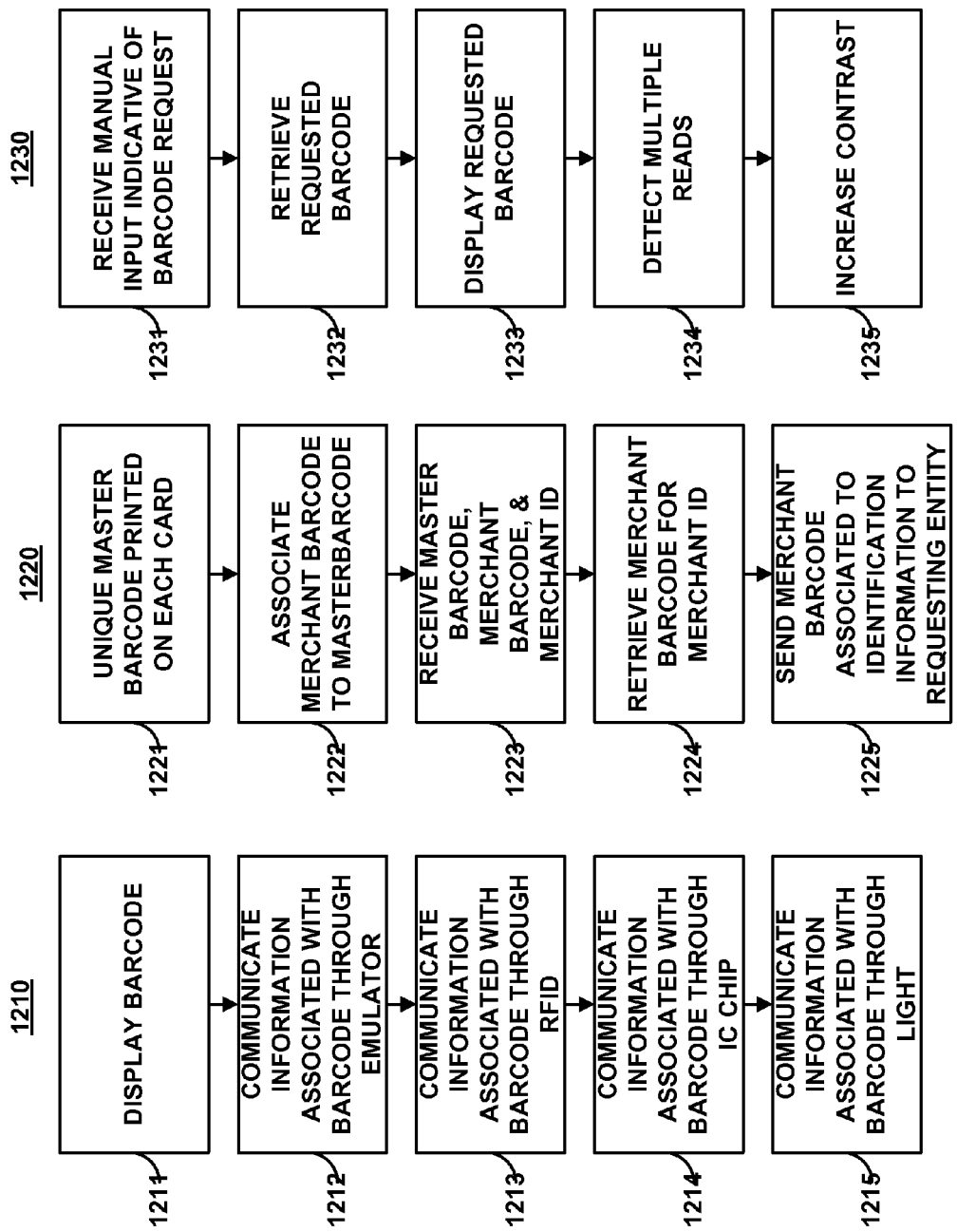
FIG. 12 is an illustration of process flow charts constructed in accordance with the principles of the present invention.

FIG. 12 shows flow chart 1210, in which a barcode may be displayed in step 1211. Step 1212 may be included in which information associated with the barcode that was displayed in step 1211 is communicated through a magnetic emulator in step 1212. Step 1213 may be included, in which information associated with a barcode is communicated through an RFID. Step 1214 may be included, in which information associated with a barcode is communicated through an IC chip (e.g., an EMV chip) in step 1214. Step 1215 may be included, in which information associated with a barcode is communicated via a source of light.

Flow chart 1220 may be included, in which a unique master barcode is printed on each card of a group of cards in step 1221. A merchant may desire to associate a barcode associated with the merchant to a master barcode. Accordingly, a merchant may store the master barcode in servers operated by the merchant such that when a master barcode is received, a search may be performed on the servers to determine if there is an associated merchant barcode. Alternatively, for example, a remote server operated by, for example, a third party may be sent the master barcode, the merchant barcode, and identification information for the merchant. A merchant may, for example, issue a merchant barcode for a particular master barcode. The merchant barcode, master barcode, and merchant identification information may be sent to a barcode registration server in step 1223. Accordingly, for example, a merchant may transmit the master barcode and the identification information of the merchant to the registration server in step 1223. Accordingly, the server may perform a search to see if any merchant barcode was previously registered for the received merchant identification information for the master barcode. Accordingly, the merchant barcode may be retrieved for merchant identification information in step 1224. The merchant barcode associated to the received merchant identification information may then be sent to the requesting entity in, for example, step 1225.

Flow chart 1230 may be provided and may include step 1231, in which manual input is received by a card that is indicative of a request for a barcode. Step 1232 may then occur, in which the requested barcode is retrieved. The requested barcode may be displayed in step 1233. Multiple reads of the displayed barcode by computer vision equipment may be provided in step 1234. This may be performed by, for example, a light sensor detecting a laser eye of laser-eye based computer vision equipment. The detection of multiple reads may, for example, cause the card to increase the contrast of a barcode in step 1235. Persons skilled in the art will appreciate that an increased contrast may, for example, consume additional electrical energy than a decreased contrast. Accordingly, autonomous contrast control capabilities may, for example, be utilized to conserve power. Contrast may also be controlled manually via user interfaces (e.g., capacitive or mechanical buttons).

Figure 13:
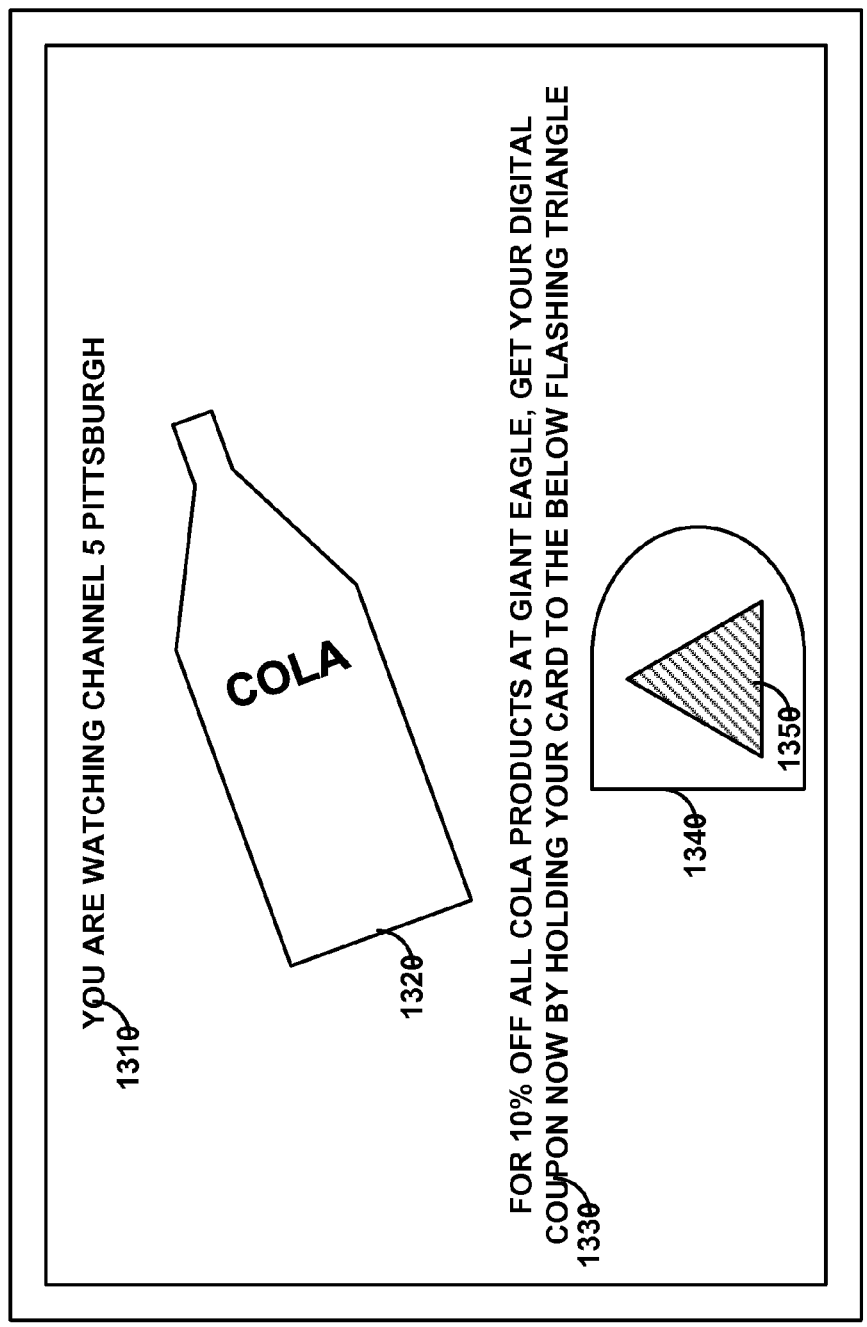
FIG. 13 is an illustration of a display constructed in accordance with the principles of the present invention.

FIG. 13 shows display 1300 that may be included, for example, on a device that includes a display screen. For example, display 1300 may be provided on a television set or personal electronic device (e.g., mobile telephonic device). Display 1300 may be a graphical user interface that may be operable to accept manual input (e.g., via a capacitive touch screen). Information may be communicated to a card via a display screen. Accordingly, for example, information may be communicated via television shows, commercials, movies, sporting events, music videos, or any other type of media that can be communicated via a display.

Display 1300 may be provided during commercial. Information in such a commercial may include information 1310 that may indicate the broadcasting network for a commercial as well as commercial region 1320. Instructions 1330 may be provided to instruct a user how to receive information from a commercial on his/her card or other device (e.g., mobile telephonic phone). Virtual object 1340 may include active region 1350, in which information may be communicated to a device via information light-pulses. A card may include a light sensor that received pulses of light from region 1350 and deciphers information from the light pulses. Information contained in light pulses may be encrypted in a variety of ways. For example, the encryption for such light pulses may be encrypted based on time. Information may include one or more barcodes. Expiration information may be associated to each one of the barcodes and transmitted to the card.

Figure 14:
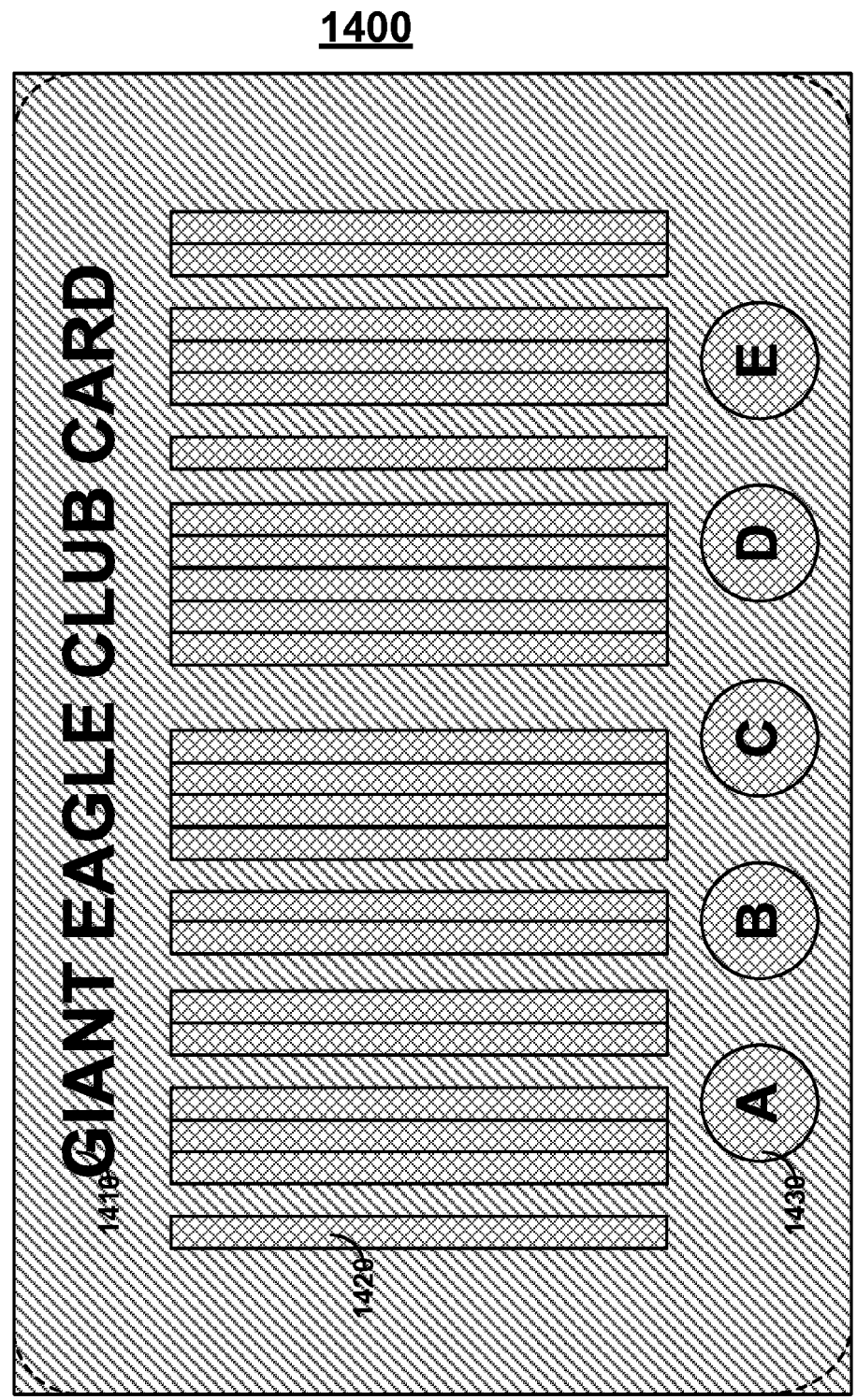
FIG. 14 is an illustration of a card constructed in accordance with the principles of the present invention.

FIG. 14 shows card 1400. One or both surfaces of card 1400 may be substantially provided as a display screen. Laminate may be provided over the screen to protect the screen. Accordingly, text information 1410 may be displayed and barcode 1420 may be displayed as well as buttons 1430. The display may be a capacitive touch display such that, for example, buttons 1430 may be displayed and used by a user.

Figure 15:
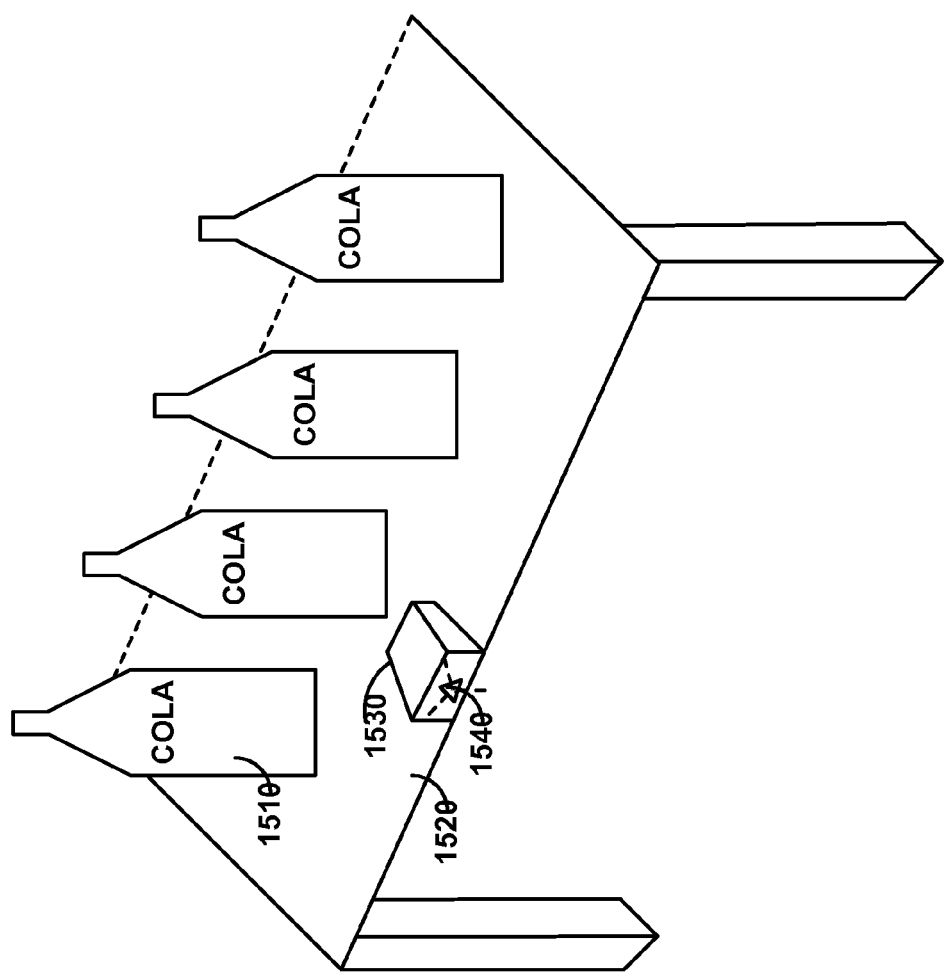
FIG. 15 is an illustration of a data transmission device constructed in accordance with the principles of the present invention.

FIG. 15 shows store environment 1500 in which product 1510 may be placed on shelf 1520 in the proximity of information transmitter 1530. Information transmitter 1530 may communicate information in a variety of ways. For example, information transmitter 1530 may include active region 1540 for sending light information pulses indicative of information to a card. Transmitter 1530 may also be a receiver and may also receive information from a card. For example, transmitter 1530 may include a light sensor and may receive light-based information pulses from a card. Alternatively, for example, transmitter 1530 may include computer vision equipment (e.g., a laser eye) and may be operable to read a barcode from a card-based display. Alternatively still, for example, transmitter 1530 may be operable to read an RFID on a card, an IC chip (e.g., an EMV chip) on a card, or a magnetic emulator or stripe on a card. A card may include a magnetic stripe that contains static information such as, for example, identification information. A card may also include one or more magnetic emulators for communicating one or more tracks of magnetic stripe data.

Coupons, as well as product information, may be communicated via transmitter 1530. For example, a user may go through a grocery store and use his/her card to tabulate a list of items in his/her shopping cart. A group barcode may then be generated from the card indicative of the unique combination of items that a user desires to purchase. A user may then, for example, present such a group barcode at the point of purchase. Similarly, coupons may be received by a card via multiple transmitters and a separate barcode for each coupon, or a barcode indicative of a group of coupons, may be displayed via a card.

Figure 16:
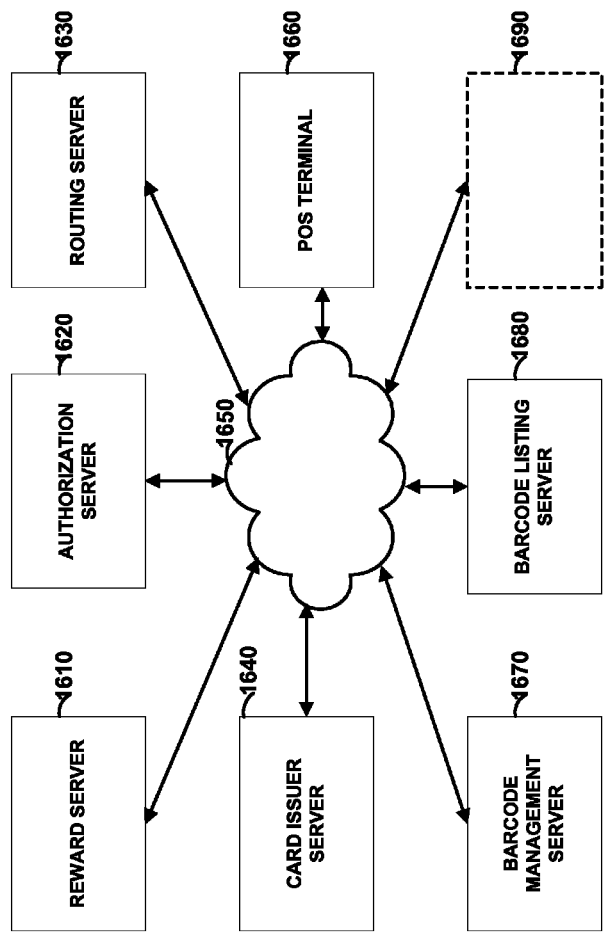
FIG. 16 is an illustration of a network topology constructed in accordance with the principles of the present invention.

FIG. 16 shows network topology 1600. Network topology 1600 may include, for example, reward server 1610. Reward server 1610 may keep track of the number of rewards obtained by a particular user (e.g., a particular loyalty account barcode). Reward server 1610 may add as well as subtract rewards from a user's account based on purchases. Authorization server 1620 may be included and may authorize a transaction. Persons skilled in the art will appreciate that a barcode may serve as another factor in authentication in a payment process. For example, a barcode may include identification information. The barcode may be changed with time such that the identification information is encrypted with time. Accordingly, a purchase may be authorized if, for example, the correct barcode is received for a particular period of time. Routing server 1630 may be provided to route payment information. For example, a first number of digits (e.g., the first six digits) may be utilized to route payment account information (e.g., the remaining payment account numbers) to the appropriate location (e.g., an authorization server). Payment information may be communicated in a barcode. For example, a sixteen digit credit card number may be provided as a sixteen digit barcode. A fifteen digit credit card number may be provided as a fifteen digit barcode. Also, for example, a sixteen digit credit card number may be provided in an alphanumerical barcode of a particular number of characters (e.g., twelve). Network 1650 may be utilized to communicate information and may include wire as well as wireless-based communication channels.

Card issuer server 1640 may be included in network topology 1600. Card issuer server 1640 may keep track of, for example, the information that was initially programmed into each card. POS terminal 1660 may be included and may be, for example, a cash-register having computer vision equipment and a magnetic stripe reader. Barcode management server 1670 may, for example, be utilized to manage barcodes (e.g., such as coupon barcodes). Barcode listing server 1680 may, for example, register merchant barcodes and associate them to master barcodes. Additional devices, such as device 1690, may be included. Device 1690 may, for example, be another card such that card-to-card communications may be provided such as light-based card-to-card communications (e.g., via a light sensor on one card and a source of light on another card).

FIG. 17 shows personal electronic device 1700. Personal electronic device 1700 may include manual buttons 1740 as well as display 1710 with virtual buttons 1750. Barcode 1730 may be displayed on virtual card 1720. Virtual buttons 1750 may be provided on virtual card 1720 or otherwise on, for example, display 1710.

Tickets, such as entertainment tickets or travel tickets, may be stored on the memory of a card and displayed via a display. For example, train and airline tickets may be stored on a card and associated information may be displayed via one or more barcodes. Similarly, movie and theater tickets may be stored and associated information displayed via one or more barcodes.

Furthermore, persons skilled in the art will appreciate that multiple types of barcodes may be deployed (e.g., color-based, line-based, triangle-based barcodes). For example, a 3D barcode may be displayed. Furthermore, for example, a line-based barcode may be utilized where the thicknesses of the lines correlate to information. Persons skilled in the art will appreciate that a display (e.g., a non bi-stable display) may have segments that expand with additional charge. Accordingly, a single segment on a display may display multiple different types of information by being provided with different levels of charge. For example, no charge may be utilized to not display any line on a segment (e.g., a "0"), a first amount of charge may be utilized to display a line of a first thickness on a segment (e.g., a "1"), and a second amount of charge may be utilized to display a line of a second thickness on a segment (e.g., a "2").

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A payment card comprising:
a display operable to display a barcode;
a battery;
a dynamic magnetic stripe communications device operable to communicate data to a magnetic stripe reader; and
a button,
wherein said data includes barcode data in a discretionary data field of magnetic stripe track data.

2. The payment card of claim 1, further comprising:
a second button; and
a processor,
wherein at least said button and said second button are operable to receive at least a part of a manually input unlocking code for accessing additional card functionality via said processor.

3. The payment card of claim 1, further comprising:
a second barcode,
wherein said display is operable to display said second barcode with said barcode.

4. The payment card of claim 1, wherein said display is operable to display said barcode via a plurality of electrodes that each take the shape of a line.

5. The payment card of claim 1, wherein said display is a bi-stable display.

6. The payment card of claim 1, wherein said display is a non bi-stable display.

7. The payment card of claim 1, wherein said display is an electrochromic display.

8. The payment card of claim 1, wherein said barcode is representative of twelve digits of data and one of said twelve digits of data is utilized as a check-sum digit.

9. The payment card of claim 1, further comprising a light sensor operable to receive pulses of light representative of information.

10. The payment card of claim 1, further comprising a source of light operable to communicate light pulses representative of information.

11. The payment card of claim 1, further comprising:
a memory,
wherein said button is operable to program said barcode into said memory.

12. The payment card of claim 1, wherein said button is operable to activate said operation of said display.

13. The payment card of claim 1, wherein said barcode is representative of a loyalty account number.

14. The payment card of claim 1, wherein said barcode is representative of a payment account number.

15. The payment card of claim 1, wherein said barcode is representative of a coupon.

16. The payment card of claim 1, further comprising a memory, wherein a plurality of loyalty account numbers are stored in said memory and said barcode is representative of one of said plurality of loyalty account numbers.

17. The payment card of claim 1, wherein said barcode is permanently printed as electrodes of said display and said barcode is the only barcode said display is operable to display with said electrodes.

18. The payment card of claim 1, further comprising a second barcode, wherein said second barcode is permanently printed outside of said display.

19. The payment card of claim 1, wherein said barcode is representative of an airplane ticket.

20. The payment card of claim 1, wherein said barcode is represented by a plurality of line segment contacts, a first amount of charge is applied to one of said plurality of line segment contacts to form a visible line of a first thickness, and a second amount of charge is applied to said one of said plurality of line segment contacts to form a visible line of a second thickness.

21. A payment card, comprising:
a display operable to display a barcode;
a battery;
a dynamic magnetic stripe communications device operable to communicate data to a magnetic stripe reader; and
a button,
wherein at least a portion of a payment card number is printed on a surface of said payment card, and
said data includes barcode data in a discretionary data field of magnetic stripe track data.

* * * * *